United States Patent
Boegelein et al.

(10) Patent No.: US 7,984,779 B2
(45) Date of Patent: Jul. 26, 2011

(54) LOCKING MECHANISM

(75) Inventors: Rolf Boegelein, Crailsheim (DE); Oleg Plastinin, Landshut (DE)

(73) Assignee: Jungheinrich Aktiegesellschaft, Hamburg (DE)

( * ) Notice: Subject to any disclaimer, the term of this patent is extended or adjusted under 35 U.S.C. 154(b) by 439 days.

(21) Appl. No.: 12/142,111

(22) Filed: Jun. 19, 2008

(65) Prior Publication Data
US 2008/0314662 A1 Dec. 25, 2008

(30) Foreign Application Priority Data
Jun. 22, 2007 (DE) .......................... 10 2007 028 862

(51) Int. Cl.
*B60R 16/04* (2006.01)
*H01M 2/20* (2006.01)

(52) U.S. Cl. ........................................ 180/68.5; 429/97
(58) Field of Classification Search ................ 180/65.1, 180/68.5; 105/51; 429/97
See application file for complete search history.

(56) References Cited

U.S. PATENT DOCUMENTS

| | | | |
|---|---|---|---|
| 4,991,674 A | | 2/1991 | Fullenkamp |
| 5,360,307 A | * | 11/1994 | Schemm et al. ............ 414/343 |
| 6,494,279 B1 | * | 12/2002 | Hutchens ..................... 180/68.5 |
| 7,398,848 B2 | * | 7/2008 | Kondo ......................... 180/68.5 |
| 2002/0066609 A1 | * | 6/2002 | Dignitti et al. .............. 180/68.5 |
| 2005/0092536 A1 | * | 5/2005 | Takeda ........................ 180/68.5 |
| 2006/0070780 A1 | * | 4/2006 | Lin ............................. 180/68.5 |

FOREIGN PATENT DOCUMENTS

| | | |
|---|---|---|
| DE | 3101557 C2 | 8/1982 |
| DE | 19956623 A1 | 6/2001 |
| DE | 102004047339 A1 | 3/2006 |
| EP | 1 595 841 A2 | 11/2005 |
| JP | 01226428 A * | 9/1989 |
| JP | 2 038219 U | 3/1990 |
| JP | 2000357498 A | 12/2000 |
| JP | 2001316090 A | 11/2001 |

OTHER PUBLICATIONS

Mechanical Handling, Oct. 1971, p. 97.
Logistik im Unternehmen, 9, 2006, p. 17.

* cited by examiner

*Primary Examiner* — John R Olszewski
(74) *Attorney, Agent, or Firm* — Rothwell, Figg, Ernst & Manbeck, P.C.

(57) ABSTRACT

The invention relates to a locking mechanism for securing a battery pack (20) which is accommodated in an electrical vehicle (12), in particular in an electrical industrial truck, comprising a vehicle-side plug element (26) and a battery plug element (28), which can be plugged together with said plug element (26) and is connected to the battery pack (20). In this case, it is provided according to the invention that the mechanism comprises a locking element (32), which is arranged on the vehicle (12) and can be moved, in particular pivoted, between a battery release position and a battery locking position, the locking element (32) and the vehicle-side plug element (26) being arranged in relation to one another in such a way that the plug-type connection between the vehicle-side plug element (26) and the battery plug element (28) can be produced and released depending on the position of the locking element (32).

18 Claims, 6 Drawing Sheets

LOCKING MECHANISM

The present invention relates to a locking mechanism for securing a battery pack which is accommodated in an electrical vehicle, in particular in an electrical industrial truck, comprising a vehicle-side plug element and a battery plug element, which can be plugged together with said plug element and is connected to the battery pack.

In electrical vehicles, in particular electrically driven industrial trucks, with lateral battery removal it is conventional to secure the battery to prevent it from sliding out laterally by means of a suitable mechanism. In order to prevent the vehicle from being brought into operation without the battery secured, in the case of known electrical vehicles or industrial trucks enquiry devices, in particular sensors, are used which transmit a corresponding signal relating to the securing state of the battery pack to a central control unit of the vehicle, the control unit triggering a travel shutdown when the battery pack is not secured.

Although electrical vehicles and in particular industrial trucks generally have a central electronic control unit, it is desirable to keep the number of electronic component parts as low as possible since electronic component parts, in particular sensors, require wiring to the control unit and corresponding programming of the control unit.

The object of the invention is to provide a mechanism for securing a battery pack which results in a simplified electronic control system given the same reliability in terms of the securing mechanism.

In this regard, it is proposed according to the invention that the locking mechanism comprises a locking element, which is arranged on the vehicle and can be moved, in particular pivoted, between a battery release position and a battery locking position, the locking element and the vehicle-side plug element being arranged in relation to one another in such a way that the plug-type connection between the vehicle-side plug element and the battery plug element can be produced and released depending on the position of the locking element.

Such a dependence between the position of the locking element and the action of producing or releasing the plug-type connection makes it possible for there to be reliable mechanical influencing between the mentioned component parts, with the result that monitoring of the securing state of the battery pack is achieved as a result of purely mechanical effects.

Expediently, the plug-type connection between the vehicle-side plug element and the battery plug element can be produced and released in the battery locking position of the locking element. Since the plug-type connection produced between the vehicle-side plug element and the battery plug element is a basic prerequisite for the electrical vehicle to be brought into operation and since this plug-type connection can only be produced in the locked position of the locking element, the possibility of the vehicle being brought into operation when the battery is not secured is ruled out, as a result of which the same operational reliability is achieved as in the case of a known locking means as described above which uses detection by means of sensors.

Preferably, the locking element in its battery release position at least partially covers the vehicle-side plug element, with the result that the production of a plug-connection between the vehicle-side plug element and the battery plug element is prevented. As a result of the mechanical covering, the production of the plug-type connection and therefore the supply of current to the vehicle from the battery pack is reliably prevented when the battery pack is not secured.

In accordance with a development, the locking element can only be pivoted from the battery locking position into the battery release position when the battery plug element is unplugged. In this case, it is particularly expedient if the vehicle-side plug element is arranged in such a way that the battery plug element, which is inserted in the vehicle-side plug element, forms a stop for the locking element preventing it from pivoting into the battery release position.

Preferably, the locking element is arranged on the inner side of an accommodating compartment formed in the vehicle for the battery pack, the locking element in the battery locking position securing the battery pack which is accommodated in the accommodating compartment against a movement out of the accommodating compartment.

In accordance with a further configuration of the locking mechanism, an accommodating compartment cover, in particular an accommodating compartment door, which closes the accommodating compartment can be closed depending on the position of the locking element, with it being particularly preferable for the accommodating compartment cover to only be capable of being closed if the locking element is in the battery locking position. This ensures that the battery is generally reliably secured against falling out by the locking element provided for this purpose, as a result of which damage to the inner side of the accommodating compartment cover or undesired opening as a result of a battery pack being displaced during operation is prevented.

In this context it is also conceivable to configure the accommodating compartment cover in such a way that, in the state in which it closes the accommodating compartment, it is in engagement with the locking element in such a way that a movement of the locking element out of its locking position is not possible.

It is particularly preferable for the locking element to be capable of being pivoted about a pivot axis, which runs below or above the vehicle-side plug element. In this case, in particular the arrangement of the pivot axis beneath the vehicle-side plug element is advantageous because a battery locking position of the locking element can hereby be achieved by means of it being pivoted downwards. In such a downwardly pivoted position, which is generally horizontal for the purpose of optimum securing of the battery pack, the locking element can be prevented from moving further downwards as a result of a simple mechanical stop. A pivoting movement counter to the force of gravity, which acts on the locking element, out of this locking position into the generally vertical battery release position is virtually impossible.

The invention proposes a configuration of the locking element in accordance with which the latter is in the form of a manually actuable lever, whereby it is particularly preferred for the lever to be configured in such a way that it has at least one lever section, which secures the battery pack in the battery locking position and which at least partially covers the vehicle-side plug element in the battery release position.

In accordance with a further aspect, the invention relates to an industrial truck with a locking mechanism according to the invention.

In this case, it is particularly preferred for the accommodating compartment to be arranged between a front and a rear axletree of the industrial truck and to make lateral removal or lateral insertion of the battery pack out of or into the accommodating compartment possible.

The invention will be described below using a non-restrictive embodiment with reference to the attached drawings, in which.

Figure 1:
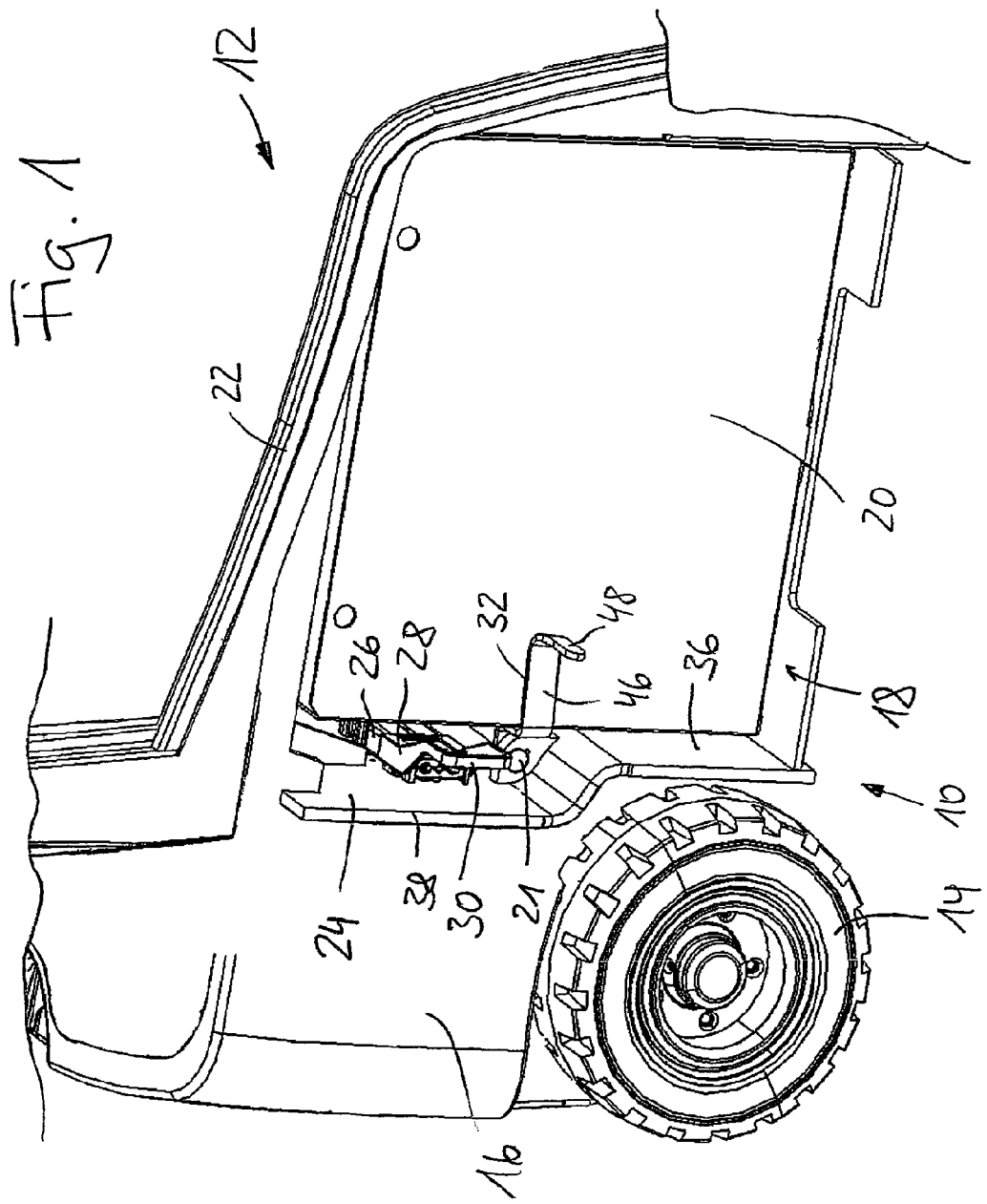
FIG. 1 shows a perspective and schematic partially sectional illustration of a right-hand side of an industrial truck with a battery pack inserted into an accommodating compartment and with an embodiment of the locking mechanism according to the invention.

FIG. 1 illustrates part of a right-hand side 10 of an electrically driven industrial truck 12. The figure shows the right-hand rear wheel 14 and a receptacle 18, which is formed in the chassis 16 of the industrial truck 12 and into which a battery pack 20 is inserted. The accommodating compartment 18 extends between the axletree associated with the rear wheel 14 and a front axletree (not illustrated). A frame construction 22 associated with the driver's cab is indicated as being above the receptacle 18.

In the accommodating compartment, a vehicle-side plug element, in this case in the form of a socket 26, is fixedly connected to the vehicle chassis 16 on the rear inner wall 24. The socket 26 is arranged so as to be offset inwards in relation to the outer side of the industrial truck. A plug-type element, in this case in the form of a plug 28, which is connected to the battery pack 20 via a cable (not illustrated) can be plugged into the socket 26. The plug 28 has a robust grip 30, which can be gripped by the plug 28 and inserted into or withdrawn from the socket 26.

In FIG. 1, the plug 28 is inserted into the socket 26 and beneath the plug 28 there is a lever 32, which forms a locking element for the battery pack 20 inserted into the receptacle 18. The lever 32 is mounted on a flange 34 on the rear inner wall 24 of the receptacle 18 in such a way that it is capable of pivoting about a pivot axis 21, with the result that it can be pivoted between a battery locking position (illustrated in FIG. 1), or closed position and a battery release position (FIG. 2) or open position.

Figure 2:
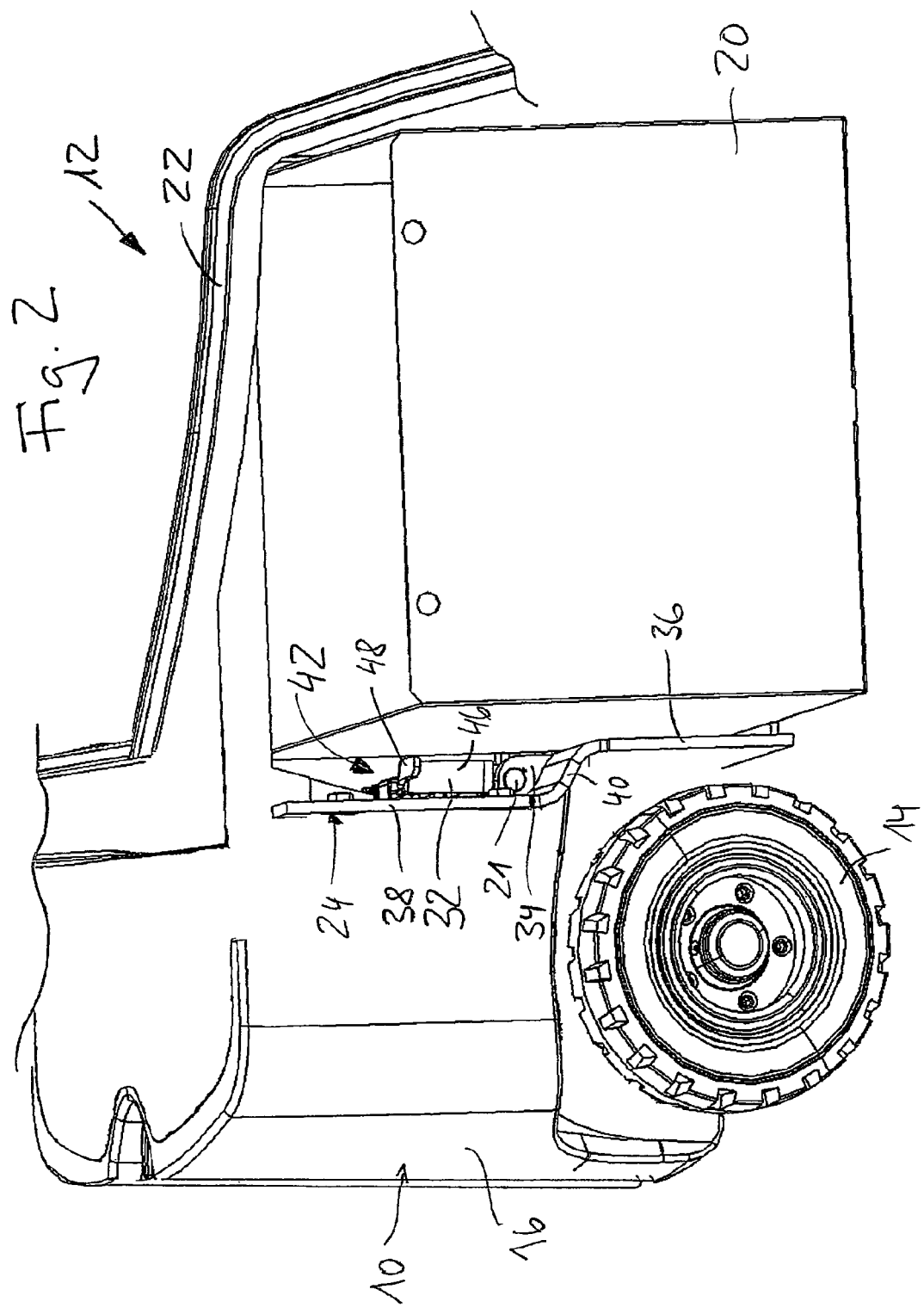
FIG. 2 shows a perspective and schematic partially sectional illustration of the right-hand side of the industrial truck, the battery pack having been partially withdrawn from the accommodating compartment.

It can be seen from FIG. 2 that the battery pack 20 as a whole can be removed from the accommodating compartment 18 if the lever 32 is in the open position, i.e. in the position releasing the battery pack 20. The inner wall 24 of the accommodating compartment 18 is bent twice, with the result that it has a lower wall section 36 and an upper wall section 38, which are connected via an approximately diagonal intermediate section 40. The upper wall section 38 is further towards the rear in comparison with the lower wall section, with the result that an area 42 is formed in which the socket 26 and the lever 32 are accommodated. In general, the battery pack 20 is guided by guide rails formed in the base of the receptacle 18, with the result that it should not come into contact with the lower wall section 36. However, the lower wall section 36 limits the in particular unintentional movement of the battery pack 20 towards the rear, with the result that contact between the battery pack 20 and the socket 26 or the lever 32 in the release position can be ruled out.

Figure 3:
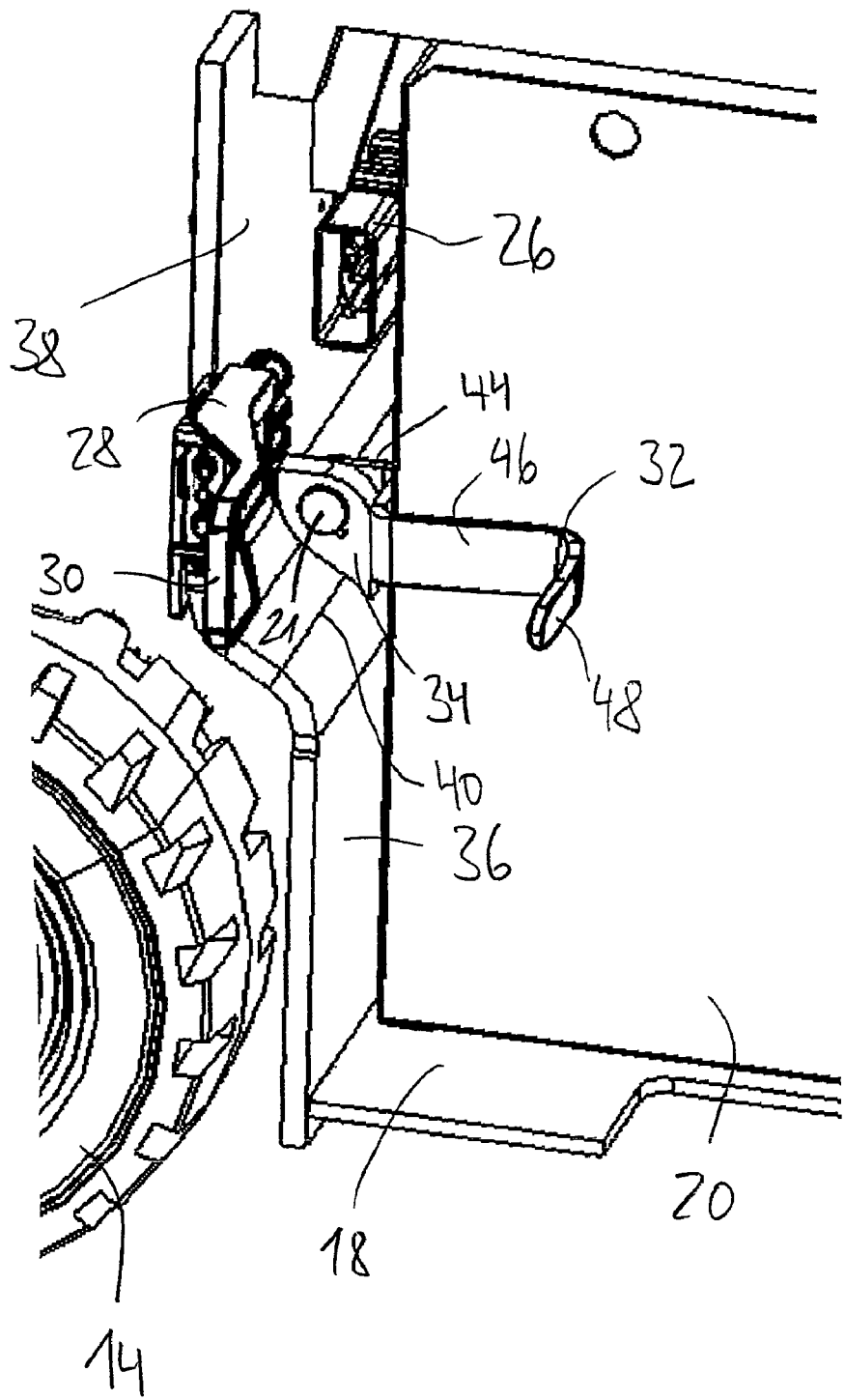
FIG. 3 shows a perspective and schematic enlarged illustration of the region delimited by dash-dotted lines in FIG. 1, the locking mechanism being in its closed position with the battery pack not connected.
Figure 4:
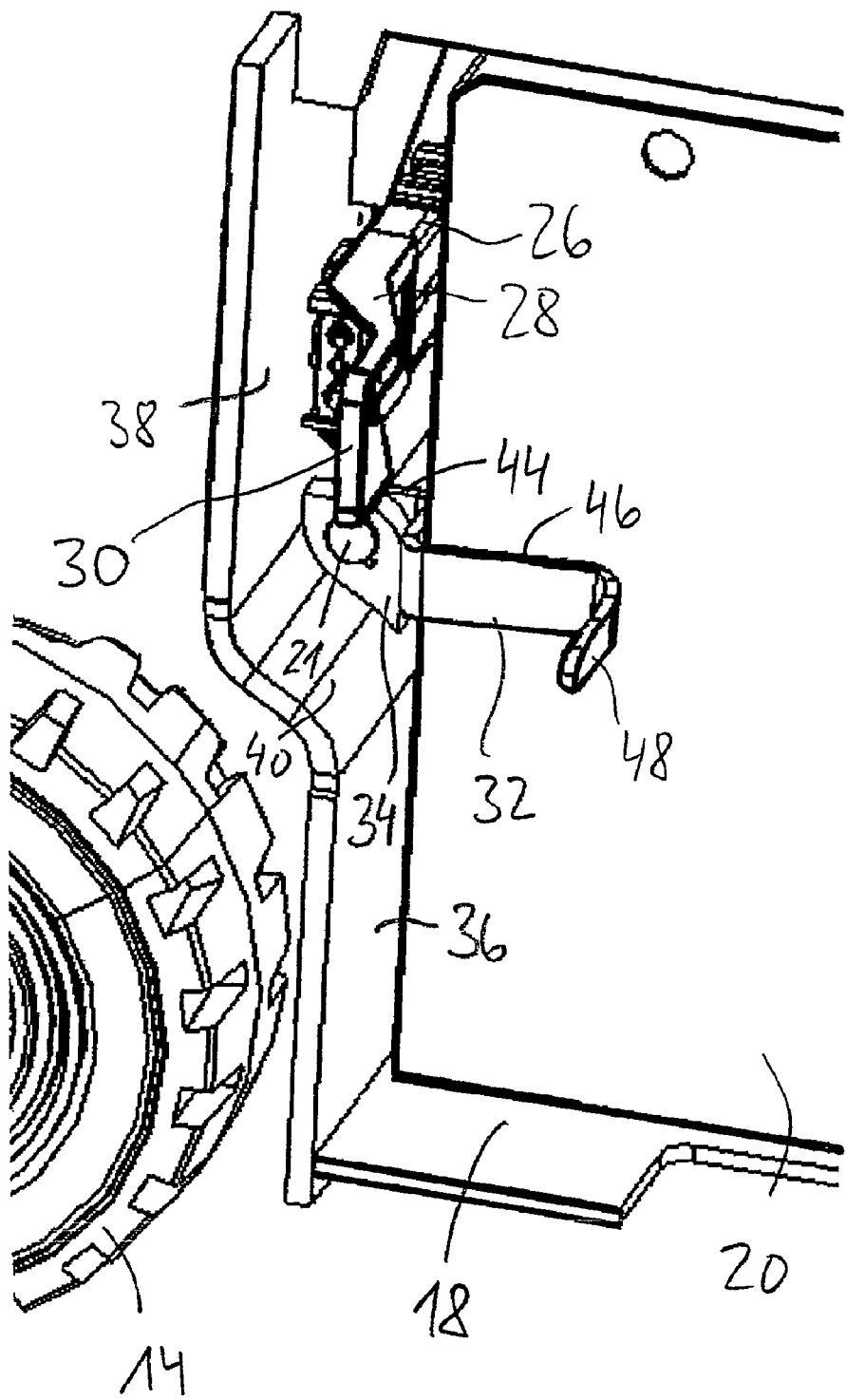
FIG. 4 shows a perspective and schematic enlarged illustration of the region delimited by dash-dotted lines in FIG. 1, the locking mechanism being in its closed position with the battery pack connected.
Figure 5:
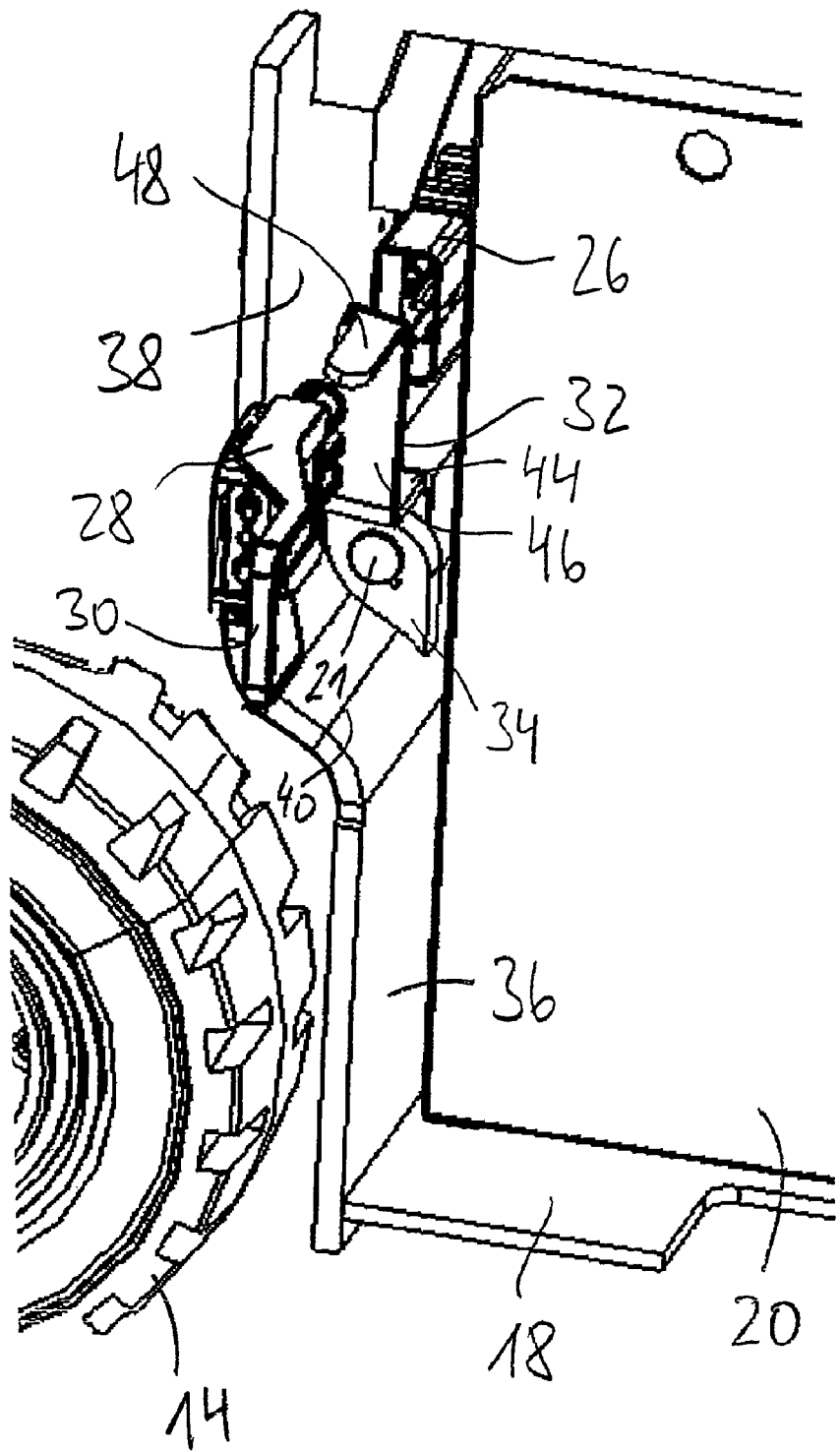
FIG. 5 shows a perspective and schematic enlarged illustration of the region delimited by dash-dotted lines in FIG. 1, the locking mechanism being in its open position.

FIGS. 3 to 5 show different positions of the lever 32 and the connection between the plug 28 and the socket 26 in order to explain the principle of the locking mechanism.

When the battery pack 20 has been inserted, the lever 32 can be brought into the battery locking position as shown in FIG. 3, whereby it releases the socket 26, with the result that the plug 28 can be inserted into the socket and plugged together with it, as is illustrated in FIG. 4. If the battery pack is secured against moving out of the receptacle 18 laterally by means of the lever 32 and the plug-type connection between the plug 28 and the socket 26 has been produced, the industrial truck can be brought into operation since the power supply is ensured.

It is further apparent from FIG. 4 that the socket is only offset inwards into the receptacle 18 to such an extent that the plug 28 in the plugged-in state with a part, in particular with a section of the grip 30, prevents the movement of the lever 32 out of the locking position into the open position shown in FIG. 3. The release of the battery pack 20 by means of the lever 32 is consequently only possible when the plug 28 is unplugged.

As soon as the plug 28 is removed from the socket 26, the lever 32 can be pivoted into the battery release position shown in FIG. 5. In this position, the lever 32 blocks access to the socket 26, with the result that it is not possible to connect the plug 28 in the release position of the lever 32. The industrial truck therefore cannot be brought into operation when the battery pack is incorrectly inserted and secured.

The lever 32 is curved at three points through approximately 90 degrees, with the result that it has a wavy profile. As a result, a fastening section 44, which is connected to the flange 34, forms a locking section 46 and an actuating section 48. The locking section 46 is in this case dimensioned in such a way that, in the locking position, it reliably secures the battery pack against moving out of the receptacle 18 laterally in the locking position and that, in the release position, it covers the socket 26 to such an extent that the plug 28 cannot be plugged into the socket.

As a result of the interaction between the arrangement of the socket 26, the dimensions of the plug 28 and the arrangement of the lever 32 in relation to the socket 26 or the plug 28 inserted into the socket, reliable mechanical securing of the battery pack, on the one hand, and reliable, non-electronic monitoring of the industrial truck being brought into operation correctly are provided.

Figure 6A:
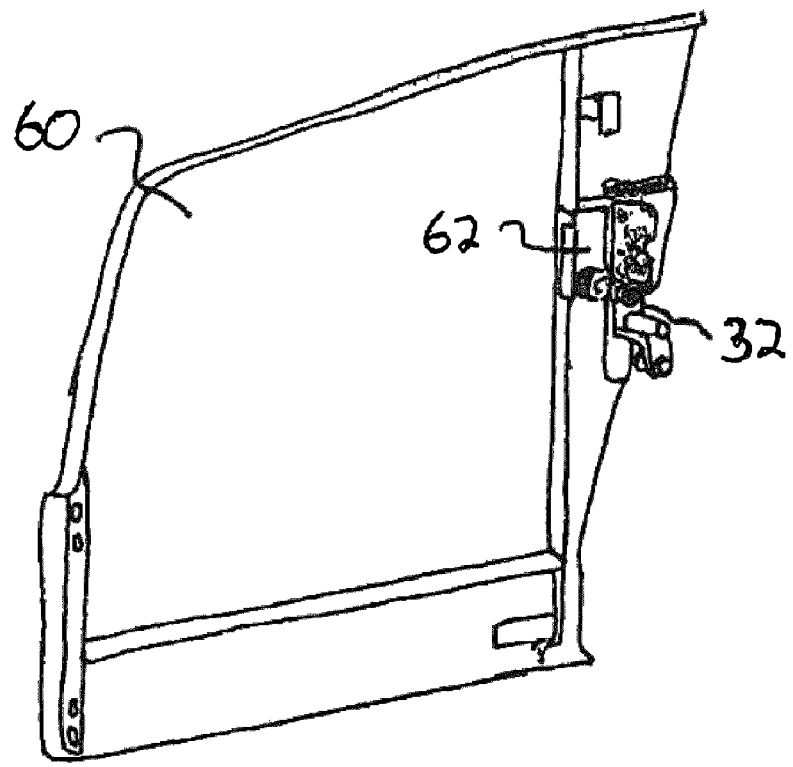
FIGS. 6a and 6b show a perspective illustration of a cover having a protruding stop and its interaction with the locking mechanism in its open and locking positions, respectively.
Figure 6B:
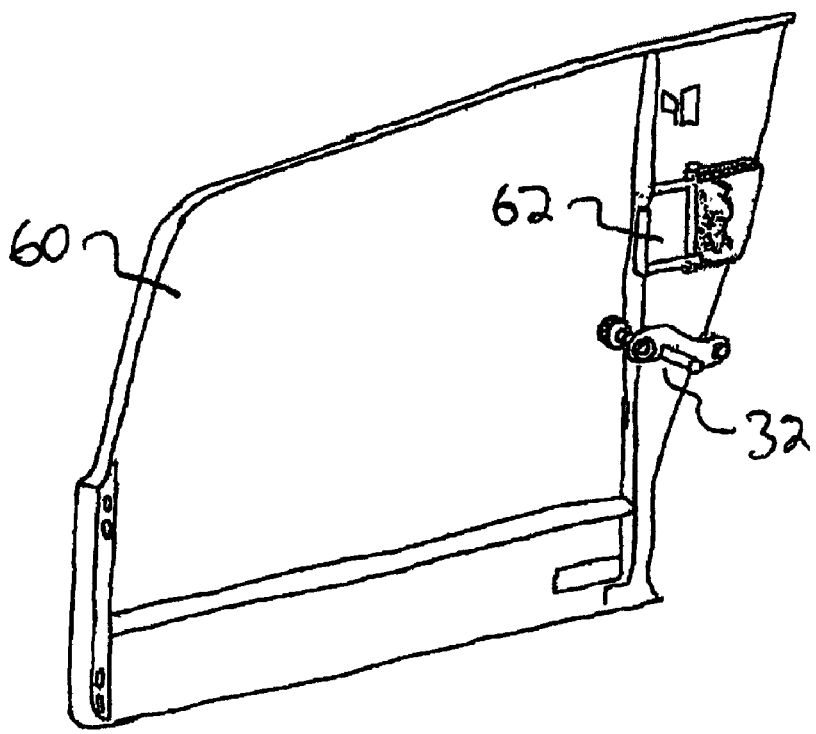

The receptacle 18 is generally closed by a cover 60, in particular a door, shown in FIGS. 6a and 6b. The cover 60 can in this case in particular also be designed in such a way that it can only be closed when the lever 32 is in the locking position shown in FIGS. 3, 4 and 6b. For this purpose, it can have a protruding stop 62, which is directed inwards, i.e. faces the lever 32, and makes closing of the cover impossible if the lever 32 is set in the release position, as shown in FIG. 6a, for example in the region in which the lever 32 would come to lie in its release position.

In addition to the embodiment illustrated here as a pivotable lever, other embodiments for the locking element are of course also conceivable. For example, the locking element may be in the form of a type of slide, which can be pushed to and fro substantially horizontally between the release position and the locking position.

As a result of its simple mechanical construction, the locking mechanism according to the present invention means that an electronic component for detecting proper battery locking and corresponding programming of a central control unit are no longer possible, with the result that simplification in terms of the electronic control is achieved.

The invention claimed is:

1. A locking mechanism for securing a battery pack which is accommodated in an electrical vehicle, the locking mechanism comprising:
   a vehicle-side plug element;
   a battery plug element that is capable of being plugged together with said vehicle-side plug element and connected to the battery pack; and
   a locking element that is arranged on the vehicle and capable of being moved between a battery release position and a battery locking position, the locking element and the vehicle-side plug element being arranged in relation to one another in such a way that a plug-type connection between the vehicle-side plug element and the battery plug element is capable of being produced and released depending on the position of the locking element,
   wherein the locking element, in its battery release position, at least partially covers the vehicle-side plug element such that the production of the plug-connection between the vehicle-side plug element and the battery plug element is prevented.

2. The locking mechanism according to claim 1, wherein the plug-type connection between the vehicle-side plug element and the battery plug element is capable of beg produced and released in the battery locking position of the locking element.

3. The locking mechanism according to claim 1, wherein the locking element is capable of being pivoted from the battery locking position into the battery release position only when the battery plug element is unplugged.

4. The locking mechanism according to claim 3, wherein the vehicle-side plug element is arranged in such a way that the battery plug element, when inserted in the vehicle-side plug element, forms a stop for the locking element and prevents the locking element from pivoting into the battery release position.

5. The locking mechanism according to claim 1, wherein the locking element is arranged on the inner side of an accommodating compartment formed in the vehicle for the battery pack.

6. The locking mechanism according to claim 5, wherein the locking element in the battery locking position secures the battery pack which is accommodated in the accommodating compartment against a movement out of the accommodating compartment.

7. The locking mechanism according to claim 5, wherein an accommodating compartment cover, which closes the accommodating compartment is capable of being closed depending on the position of the locking element.

8. The locking mechanism according to claim 7, wherein the accommodating compartment cover can only be closed if the locking element is in the battery locking position.

9. The locking mechanism according to claim 7, wherein the accommodating compartment cover is formed in such a way that, in the state in which it closes the accommodating compartment, it is in engagement with the locking element in such a way that a movement of the locking element out of its locking position is prevented.

10. The locking mechanism according to claim 7, wherein the accommodating compartment cover is an accommodating compartment door.

11. The locking mechanism according to claim 1, wherein the locking element is capable of being pivoted about a pivot axis, which runs below or above the vehicle-side plug element.

12. The locking mechanism according to claim 1, wherein the locking element is in the form of a manually actuable lever.

13. The locking mechanism according to claim 12, wherein the lever is designed in such a way that it has at least one lever section that secures the battery pack in the battery locking position and at least partially covers the vehicle-side plug element in the battery release position.

14. The industrial truck comprising a locking mechanism according to claim 1.

15. The industrial truck according to claim 14, wherein the accommodating compartment is arranged between a front and a rear axletree of the industrial truck and makes lateral removal or lateral insertion of the battery pack out of or into the accommodating compartment possible.

16. The locking mechanism according to claim 1, wherein the electrical vehicle is an electrical industrial truck.

17. The locking mechanism according to claim 1, wherein the locking element is capable of being pivoted between the battery release position and the battery locking position.

18. The locking mechanism according to claim 1, wherein the locking element comprises at least one section that secures the battery pack in the battery locking position and that at least partially covers the vehicle-side plug element in the battery release position.

* * * * *